(12) United States Patent
Venkatram

(10) Patent No.: US 6,979,094 B1
(45) Date of Patent: Dec. 27, 2005

(54) MULTI-COLOR BACKLIGHTING OF INSTRUMENT CLUSTER DISPLAYS

(75) Inventor: Sanjiv Venkatram, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/824,472

(22) Filed: Apr. 15, 2004

(51) Int. Cl.[7] .............................................. G01D 11/28
(52) U.S. Cl. ..................................................... 362/23
(58) Field of Search .............................. 362/23, 26, 28, 362/29; 296/70; 180/90; 368/24, 67, 227, 368/241; 359/850, 867–869; 116/62.1, 286–288, 116/DIG. 5, DIG. 6, DIG. 36; 340/438, 441

(56) References Cited

U.S. PATENT DOCUMENTS

| | | | |
|---|---|---|---|
| 5,706,757 A | | 1/1998 | Hashimoto et al. |
| 6,508,562 B1 | | 1/2003 | Venkatram et al. |
| 6,595,667 B1 | * | 7/2003 | Obata .......................... 362/489 |
| 6,663,252 B1 | | 12/2003 | Fong et al. |
| 6,675,650 B1 | | 1/2004 | Paulo |
| 2002/0002941 A1 | * | 1/2002 | Nakane ....................... 116/286 |
| 2002/0135994 A1 | * | 9/2002 | Ikarashi et al. ............... 362/23 |

* cited by examiner

Primary Examiner—Renee Luebke
Assistant Examiner—Leah S Lovell
(74) Attorney, Agent, or Firm—Daniel R. Edelbrock

(57) ABSTRACT

A reflector provides different-colored backlighting to indicia and a background field of an instrument dial. The dial is mounted on a reflector, forming an interior space. The reflector is assembled on a printed circuit board (PCB). A recessed section of the reflector has an opening exposing a portion of the PCB to the interior space. Another section of the reflector provides a short tube having an inner cavity suspended over the opening. A first group of light emitting diodes is mounted on the exposed portion of the PCB under the tube such that light from the first group is reflected through the inner cavity to light a pointer. A second group of light emitting diodes having a different color is mounted outside the tube and backlights the indicia of the dial. A gap between the exposed portion of the PCB and an end of the tube enables light to leak from the inner cavity and backlight the background field of the dial a different color than the indicia.

20 Claims, 4 Drawing Sheets

MULTI-COLOR BACKLIGHTING OF INSTRUMENT CLUSTER DISPLAYS

BACKGROUND OF THE INVENTION

1. Field of the Invention

The invention relates in general to illuminating instrument cluster display components and more specifically to providing different-colored backlighting to separate segments of an instrument dial face.

2. Discussion of Related Art

The stylish appearance of instrument cluster displays in the instrument panels and dashboards of vehicles has become very important to the final customer, and therefore the vehicle maker. The multiple color requirements are highly challenging to achieve using light emitting diodes. The problem has been temporarily addressed by using incandescent bulbs as the backlighting source for instrument dials. However, incandescent bulbs have shorter life spans than light emitting diodes, raising issues such as reliability and bulb replacement costs. Optional arrangements that enable the efficient use of light emitting diodes to get the multi-color light effect would have important advantages. Instrument clusters require multiple dials and displays and they all need to be illuminated, so part count and material weight become important issues.

Light emitting diodes require much less power than incandescent bulbs, but are not as bright or intense. To reduce the need for large numbers of light emitting diodes to light a single dial face, reflectors, such as the one disclosed in U.S. Pat. No. 6,508,562, are often designed to evenly spread light over the area of the dial using as few light emitting diodes as possible, while providing the necessary illumination intensity. Typically, as suggested by an embodiment disclosed in U.S. Pat. No. 6,595,667, same-color diodes are used to illuminate an entire display face including background field, scale, characters and pointer. This fails to provide a distinctive appearance. In another embodiment of the same patent, when the colors of illumination from the light sources are chosen to be different, they are completely separated by partitions to prevent the light sources from interfering with each other. This could require larger numbers of light emitting diodes to get the lighting correct and greater material needs for more complex reflectors, increasing the number of parts, weight and cost.

SUMMARY OF THE INVENTION

Accordingly, it is an object of this invention to achieve multi-color backlighting of instrument dials in a cluster using light-emitting diodes.

Another object of this invention is to provide a single-piece reflector for an instrument dial that efficiently directs light to the pointer, indicia and background field of the dial.

A further object of this invention is to use a minimum number of parts in providing this backlighting to illuminate dial indicia, field and pointer.

In carrying out this invention in the illustrative embodiment thereof, a display or dial having indicia on a background field and a pointer is mounted on a reflector. The reflector has a bowl-shaped recessed section under the dial with an opening formed in the recessed section opposite to the dial. An angled wall section of the reflector juts into the recessed section over the opening. A short tube has a first open end attached to the angled wall and a second open end suspended by the angled wall over the opening. The first open end would press against a center part of a rear surface of the dial.

The reflector is assembled on a printed circuit board (PCB). The PCB has a portion exposed to an interior space of the reflector by the opening in the reflector. Light emitting diodes are arranged on the exposed portion. A first group would be positioned under the open, second end of the tube. A second group, different in color, would be positioned outside an outer boundary of the tube closer to the recessed section of the reflector.

A stepper motor for changing the position of the pointer is mounted on a rear or opposite side of the PCB. A pointer drive shaft extends through the PCB, through the tube and out the first open end, then through an aperture in the dial.

Light from the first group of light emitting diodes is reflected through the tube and aperture in the dial to illuminate the pointer. Light from the second group of light emitting diodes is reflected by the recessed section of the reflector to backlight the indicia on the dial. In addition, light from the first group of light emitting diodes leaks through a gap between the second open end of the tube and the PCB and is reflected by the recessed section of the reflector to backlight the background field of the dial.

The invention provides a single-piece reflector that doesn't need a large number of partitions or complex reflecting surfaces to separate the backlight colors. A minimum number of light emitting diodes are used to illuminate the display and pointer in multiple colors.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
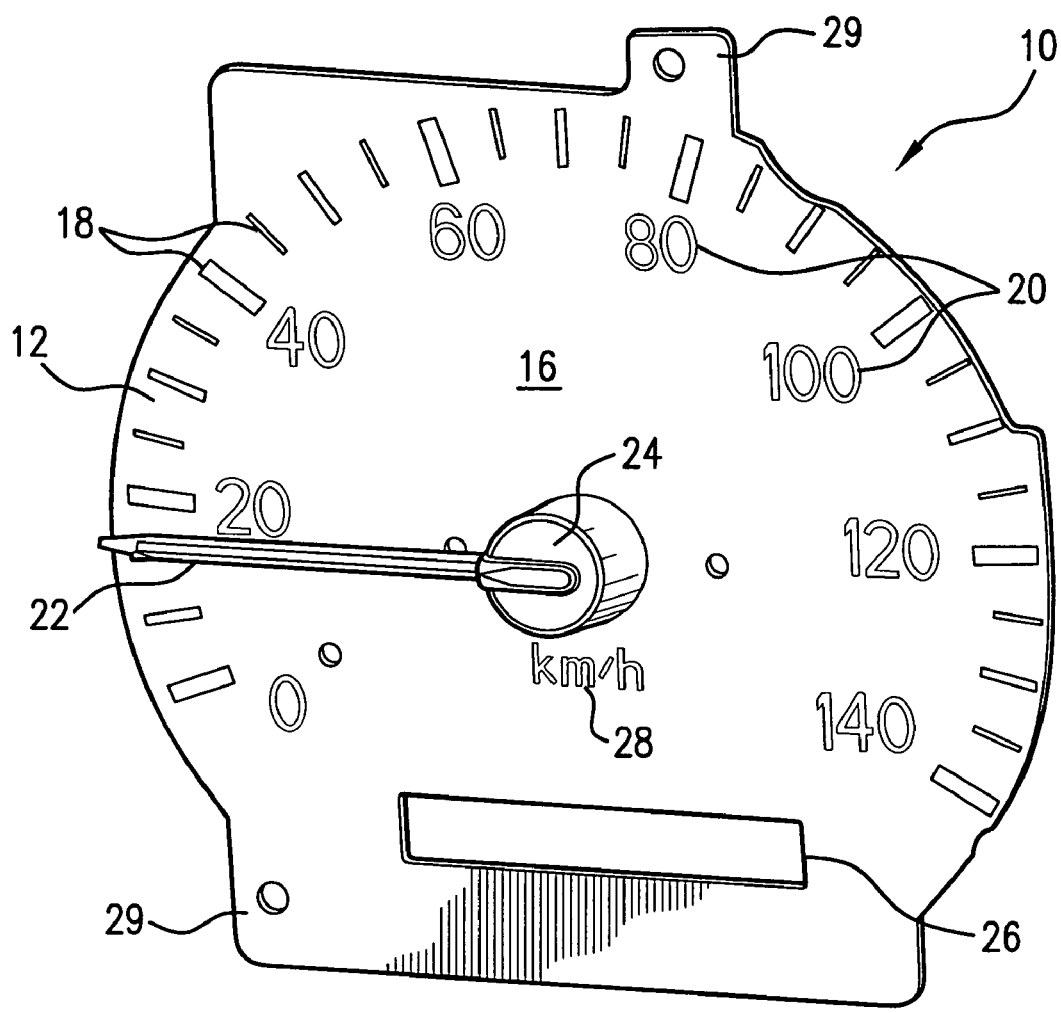
FIG. 1 is a front view of an instrument dial face.
Figure 4:
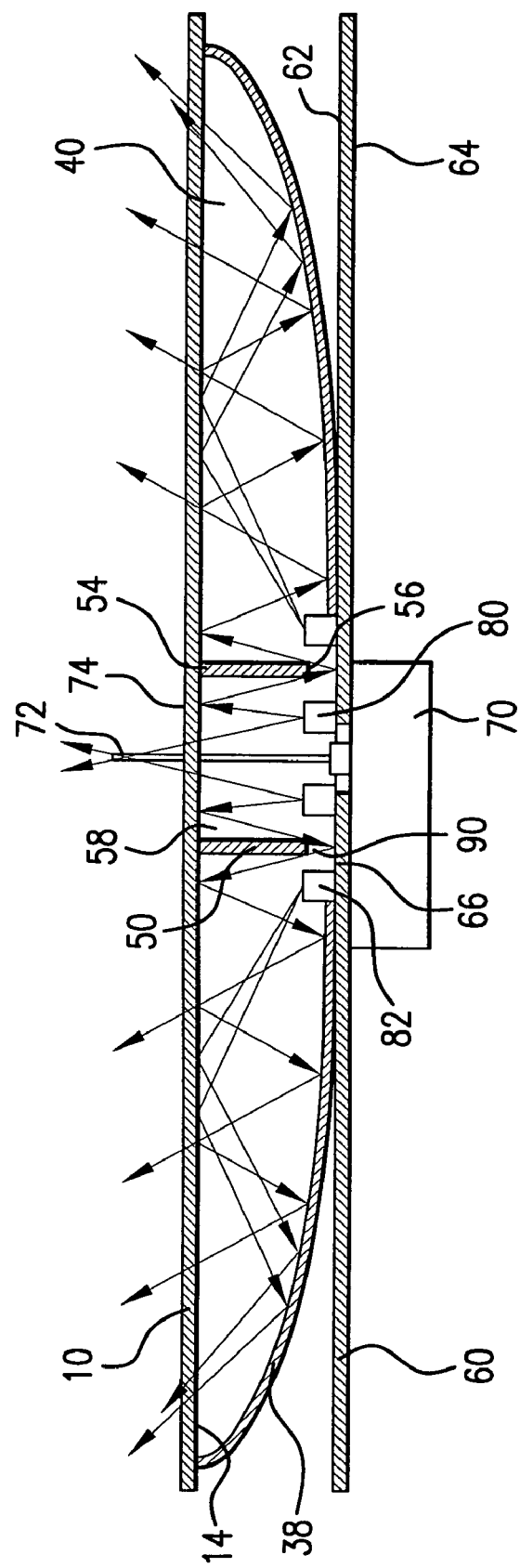
FIG. 4 is a partial side view of the assembled dial, reflector and printed circuit board.

Referring now to FIGS. 1 and 4, an example of a display or dial 10 of an instrument cluster is illustrated. The dial is generally circular and flat with a front display face 12 and a rear surface 14. The display face 12 comprises a background field 16 and various indicia including tick or scale marks 18 and characters or numbers 20. The dial is made from transparent plastic. Different-colored ink is painted on the plastic in the desired pattern of the field and indicia. The ink is used as a filter for light of a particular wavelength. The color of light passing through the dial depends on the color filtered by the ink. The present invention lights the background field 16 a different color than the indicia. For example, one recent requirement was that the field 16 be backlit a red color and the indicia be lit a pale blue color. Therefore, the color of the ink representing the indicia would be chosen to allow the pale blue color to pass through the dial and filter out the red, and the ink color of the background field would block pale blue light and enable red light to illuminate the field.

The dial may be for any type of vehicle operating parameter but a speedometer is represented in this embodiment. A light conductive pointer 22 extends from a centrally located hub 24 to indicate readings on the indicia. A foil material is hot-stamped on the underside of the pointer. The foil is selected to slightly change the wavelength of any supplied backlighting to distinguish the pointer from the background field 16. There could be a cut-out 26 in a lower part or segment of the dial 10 for an additional type of display, such as an odometer. There is a legend 28 to indicate units of measurement that will also be backlit according to the present invention. The dial illustrated includes mounting tabs 29.

Figure 2:
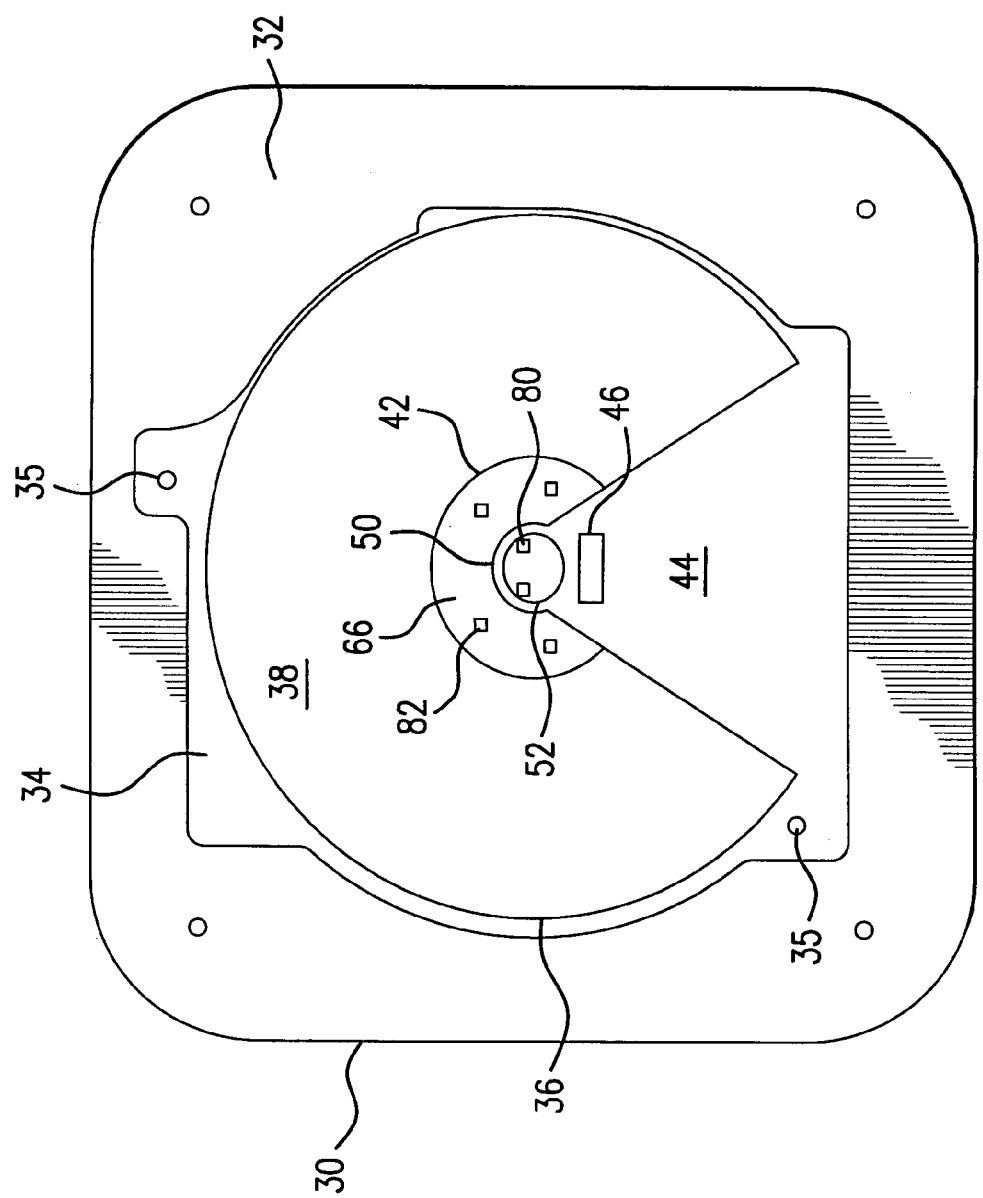
FIG. 2 is top view of instrument cluster components including a reflector and printed circuit board with the dial removed.
Figure 3:
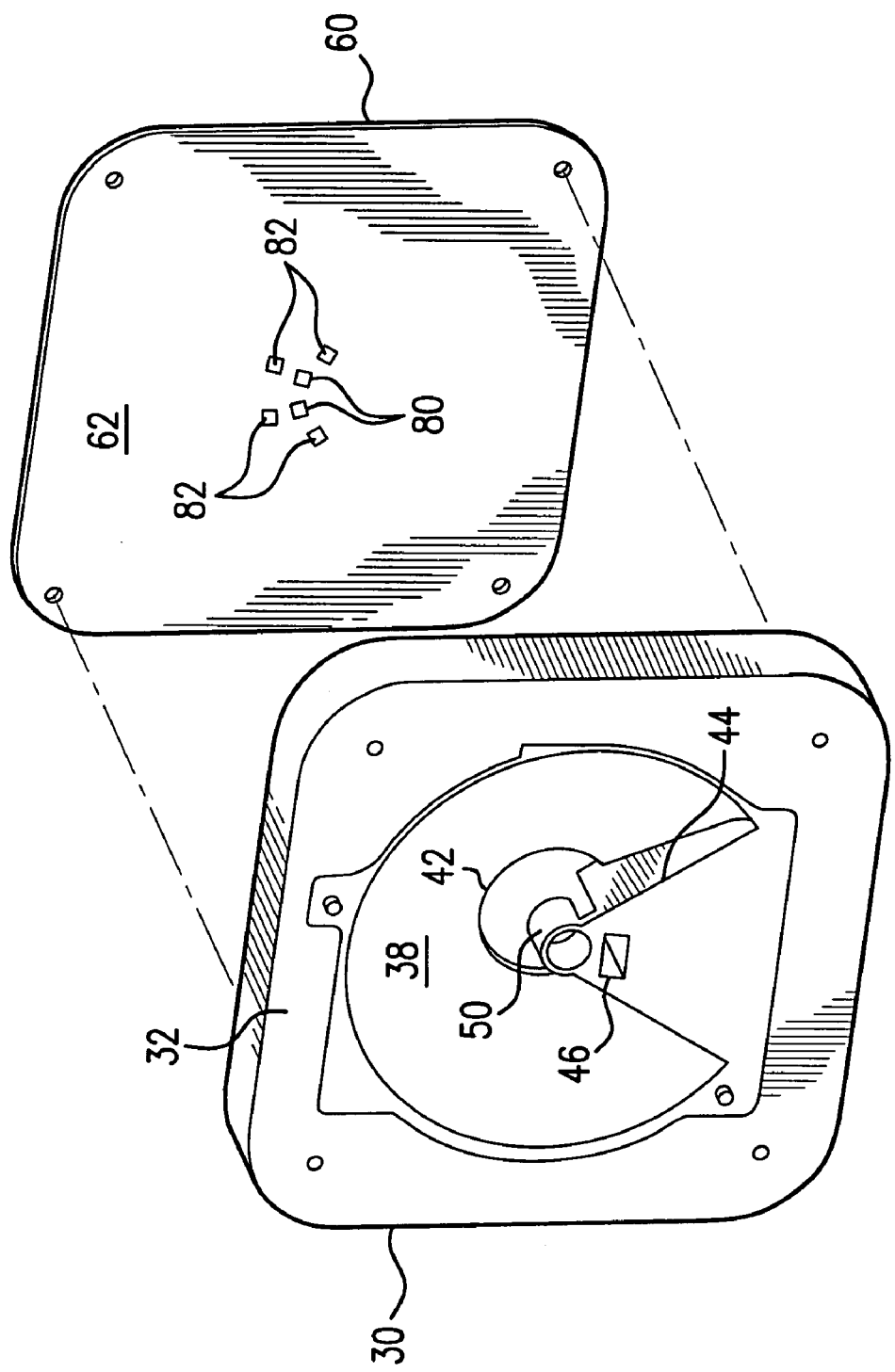
FIG. 3 is a perspective view of the reflector and circuit board prior to assembly.

The dial 10 is attached to a reflector 30 that is shown in FIGS. 2–4. The reflector is a one-piece component white in color and molded from a plastic such as Polypropylene or Acrylonitrile Butadiene Styrene. The reflector is partially bowl-shaped and comprises four sections. A first section is a base 32 including a recessed, outer mounting ring 34 for receiving and holding the dial 12. The dial may be secured by adhesive or by mechanical types of fasteners extending through the mounting tabs 29 and apertures 35 in the mounting ring. The mounting ring 34 forms an outer peripheral ledge on a second, further recessed section 36. The recessed section has a curved wall 38 that merges into the ring and forms an interior space 40. The recessed section 36 is semi-circular in shape and has a wide opening 42 at its center, at the bottom of the bowl-shape. A third section is formed by a two-sided, v-shaped or angled wall 44 that extends into the recessed section 36 to interrupt or discontinue the curved wall 38 under a lower segment of the dial. A passage 46 open at each end extends through the wall 44 from the opening 42 to a location which would be adjacent the rear surface 14 of the dial under the legend 28.

A fourth section of the reflector 30 comprises a short pipe or tube 50 cantilevered from the angled wall 44 where the two sides meet over the opening 42. The tube is formed by a cylindrical wall 52 having a top, open end 54 joined to the angled wall and a suspended bottom, open end 56 adjacent to the opening 42. The cylindrical wall encloses an inner cavity 58 and extends to a position short of a depth of the recessed section 36.

The reflector 30 is assembled on a printed circuit board (PCB) 60. This assembly can be accomplished by fasteners (not shown) extending through corners of the PCB to a rear side of the reflector base 32 or by some other, conventional means. The PCB has a first side 62 and a second, opposite underside 64. The first side has a portion 66 exposed to the interior space 40 of the reflector by the reflector opening 42. A stepper motor 70 is mounted on the underside 64 of the PCB. The stepper motor has a drive shaft 72 passing through the PCB and extending through the inner cavity 58 of the cylindrical wall 52, and then passing through an aperture 74 in the dial 10. An opposite end of the drive shaft links with the pointer 22 in the hub 24 on the dial. The stepper motor 70 rotates the drive shaft 72 to turn the pointer to a position indicating a particular scale and/or character on the dial display face 12 in response to the measurement of a vehicle condition, in this case speed. The stepper motor operates according to, for example, a microprocessor in communication with vehicle speed sensors in conventional manner. Current is delivered to the PCB through connections with the vehicle electrical system.

There are two groups or sets of light emitting diodes surface-mounted on the exposed portion 66 of the PCB and electrically connected by printed circuits (not shown). A first, inner set of light emitting diodes 80 is positioned under the tube 50 within the perimeter of the cylindrical wall 52 when the reflector 30 is assembled on the PCB 60. A second, outer set of light emitting diodes 82 is located outside the perimeter of the cylindrical wall 52. The second set of light emitting diodes has a color different than the first set. Other types of light sources may be substituted for the light emitting diodes.

When the dial 10 is mounted on the ring 34 of the reflector 30, it closes off the interior space 40 of the reflector. The dial rear surface 14 fits against the top end 54 of the cylindrical wall 52, closing off the inner cavity 58 except for the pointer shaft aperture 74 in the dial and the bottom open end 56 of the cylindrical wall 52. The bottom end 56 of the cylindrical wall is positioned at a set distance from the exposed portion 66 of the PCB. This set distance forms a gap 90 between the bottom end 56 and the first side 62 of the PCB of predetermined length.

In operation, as best illustrated in FIG. 4, light of one color from the first, inner set of light emitting diodes 80 is reflected up through the inner cavity 58 of the tube 50, through the aperture 74 in the dial to be dispersed along and to light the length of the pointer 22 a first color. Light from the second, outer set of light emitting diodes 82 is reflected by the curved wall 38 of the reflector and the back or rear surface of the dial to illuminate the scales and characters of the dial indicia a second color. Light from the outer set also travels through the passage 46 to illuminate the dial legend 28. In addition, light from the first, inner set of light emitting diodes 80 leaks through the gap 90 to be reflected by the curved wall 38 of the reflector and backlight the background field 16 of the indicia the first color. The inks covering the indicia and background field are selected to enable the light from each set to illuminate the dial in this manner. The reflector design allows a minimum number of light emitting diodes to produce this multi-color effect and provide brilliant illumination. The intensity of the field backlighting depends on the size of the gap 90. A longer or larger gap would allow more light to leak from the inner cavity and intensify the brightness of the background field.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. An indicating instrument comprising:
   a dial having a front face with indicia on a background field, and a rear surface;
   a reflector, the dial being positioned on the reflector such that an interior space is defined between the reflector and the rear surface of the dial, the reflector having an opening located opposite to the rear surface of the dial, and a cylindrical wall extending toward the opening, the cylindrical wall having an inner cavity;
   a circuit board, the reflector being positioned against the circuit board, a portion of the circuit board being exposed to the interior space through the reflector opening;
   first and second sets of lights mounted on the exposed portion of the circuit board, the first set being located directly under the cylindrical wall, the second set being located outside the cylindrical wall, a color of the first set of lights being different than a color of the second set;

wherein the cylindrical wall is spaced a predetermined distance from the printed circuit board such that light from the first set leaks out from the inner cavity and is reflected by the reflector to light the background field as light from the second set illuminates the indicia of the dial.

2. The indicating instrument of claim 1 wherein the lights are light emitting diodes.

3. The indicating instrument of claim 1 further comprising filters on the dial for allowing or preventing light of a particular wavelength to pass through the dial.

4. The indicating instrument of claim 3 wherein the filters at the locations of the indicia are selected to allow passage of light from the second set of lights and prevent passage of light from the first set of lights.

5. The indicating instrument of claim 3 wherein the filter at the location of the background field is selected to allow passage of the light leaking out from the inner cavity of the cylindrical wall and to block passage of light from the second set of lights.

6. The indicating instrument of claim 1 wherein the reflector has a curved wall forming a semi-circular bowl-shaped reflecting surface under the dial.

7. The indicating instrument of claim 6 wherein the curved wall is interrupted by a two-sided angled wall extending into part of the bowl-shaped reflecting surface.

8. The indicating instrument of claim 7 further comprising a light passage extending through the angled wall from the opening in the reflector to the rear surface of the dial.

9. The indicating instrument of claim 7 wherein the cylindrical wall with the inner cavity extends from the angled wall.

10. The indicating instrument of claim 9 wherein the cylindrical wall has a first end integral with the angled wall and a second end suspended above the opening in the reflector.

11. The indicating instrument of claim 10 further comprising a pointer on the dial and an aperture in the dial adjacent the first end of the cylindrical wall, the aperture allowing light from the first set of lights to be reflected through the inner cavity of the cylindrical wall to illuminate the pointer.

12. The indicating instrument of claim 11 wherein a pointer drive shaft passes through the inner cavity and the aperture.

13. The indicating instrument of claim 10 wherein a gap is provided between the second end of the cylindrical wall and the printed circuit board, a length of the gap providing the predetermined distance.

14. The indicating instrument of claim 13 wherein the length of the gap is sized to provide a selected intensity of illumination of the background field.

15. A method for illuminating a pointer and a background field of a dial using a first light source and indicia of a dial using a second light source of a different color comprising:

covering the background field with a first color filter and the indicia with a second, different color filter;

providing a first reflecting surface under the dial for directing light from the first light source to the pointer and a second reflecting surface under the dial for directing light from the second, different colored light source to the indicia; and allowing some light from the first light source to escape from the first reflecting surface and be reflected by the second reflecting surface to illuminate the background field.

16. A reflector for directing light to a display surface, the reflector comprising:

a recessed section with a curved wall for positioning under the display surface, the curved wall having an opening located opposite to the display surface;

a wall extending into the recessed section;

a hollow tube having first and second open ends, the first end being attached to the wall for positioning adjacent the display surface, the second end being suspended over the opening.

17. The reflector of claim 16 wherein the second end of the tube extends to a position short of a depth of the recessed section.

18. The reflector of claim 16 wherein the opening has a diameter larger than a diameter of the tube.

19. The reflector of claim 16 further comprising a passage through the wall from the opening to a location adjacent the display surface.

20. The reflector of claim 16 wherein the wall has two sides extending into the recessed section, the hollow tube being attached where the two sides meet over the opening.

* * * * *